No. 767,761. PATENTED AUG. 16, 1904.
M. MILCH.
CONTROL OF ALTERNATING CURRENT MOTORS.
APPLICATION FILED DEC. 29, 1903.
NO MODEL.
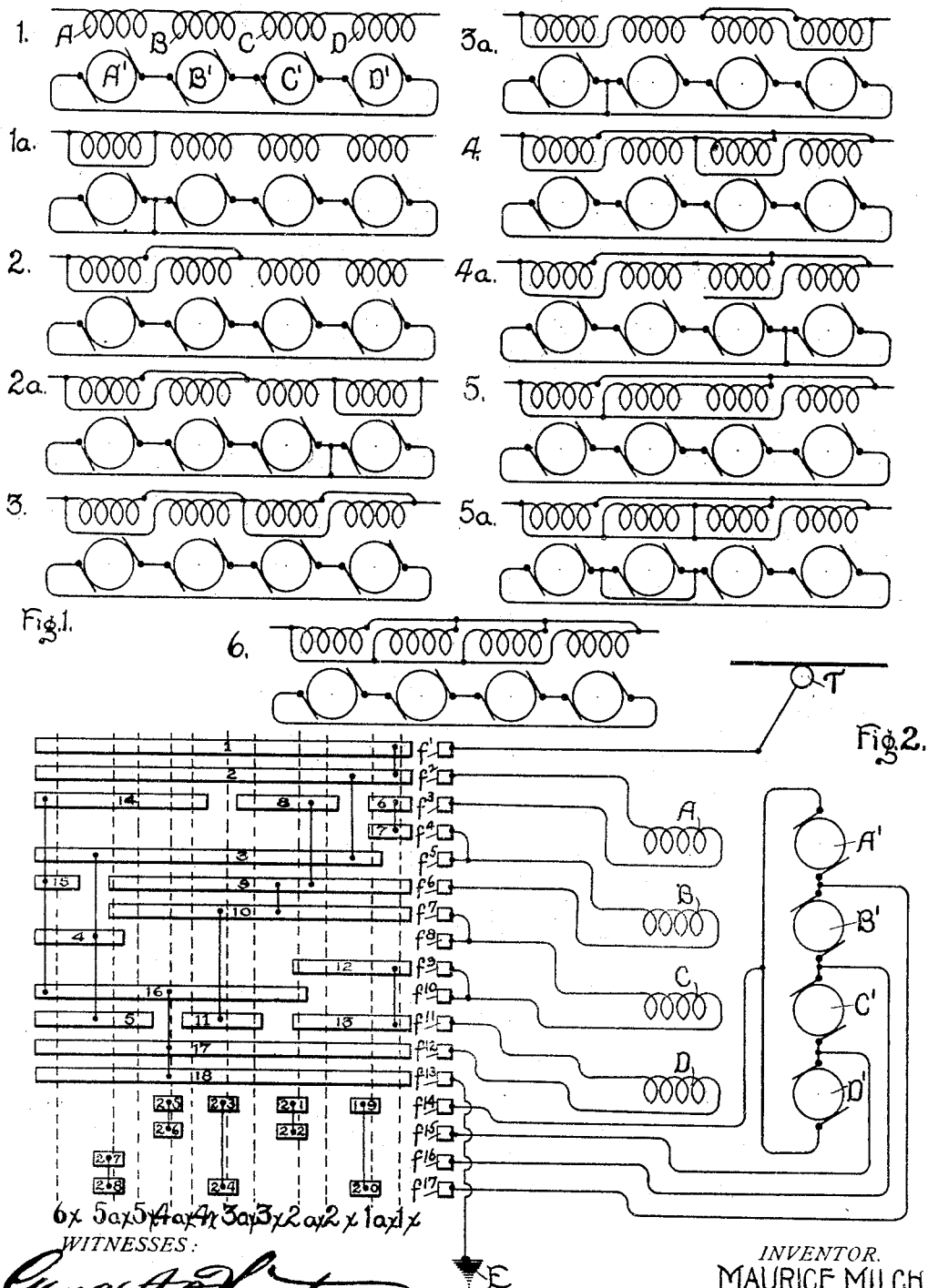
INVENTOR.
MAURICE MILCH.

No. 767,761.

Patented August 16, 1904.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

CONTROL OF ALTERNATING-CURRENT MOTORS.

SPECIFICATION forming part of Letters Patent No. 767,761, dated August 16, 1904.

Application filed December 29, 1903. Serial No. 186,953. (No model.)

*To all whom it may concern:*

Be it known that I, MAURICE MILCH, a subject of the Emperor of Austria-Hungary, residing at Schenectady, in the county of Schenectady and State of New York, have invented certain new and useful Improvements in the Control of Alternating-Current Motors, of which the following is a specification.

My invention relates to the control of alternating-current motors, and particularly to the control of motors of the single-phase commutator type. In this type of motor the field-winding induces a current in the rotor-winding which is maintained in a local closed circuit. The speed is independent of the frequency and varies with the impressed voltage.

The object of my invention is to provide a method whereby a plurality of such motors may be controlled from a single point and whereby a smooth acceleration of the motors from rest to full speed may be obtained with the use of no external resistance or voltage regulation.

Another object of my invention is to obtain this control without at any time opening the circuit and simply by varying the relative connections in such a way that each connection as it is broken is carrying little or no current.

In the accompanying drawings, Figure 1 shows diagrammatically the different circuit arrangements obtained by means of my invention. Fig. 2 shows an arrangement of switch-contacts and circuits adapted to the practice of my invention and to obtain the diagram shown in Fig. 1.

Referring first to the diagrams in Fig. 1, A, B, C, and D represent the field or primary windings of four motors which are connected in series to the line. A' B' C' D' represent the induced or rotor members of the four motors which are also connected in series in a local closed circuit. This arrangement gives the lowest speed. In diagram 1ª, field-winding A is short-circuited and the induced member A' is also short-circuited. The purpose of short-circuiting the rotor as well as the field is in order that there may not be set up a current in the short-circuit of field-winding A induced by the transformer action of rotor-winding A'. With both members short-circuited the system is in the same condition as though the motor was entirely cut out. Diagram 2 shows the second running position. Field A has its short-circuit open and one end is connected to the junction of fields B and C. Thus fields A and B are placed in parallel and in series with fields C and D. This arrangement gives the second speed. In diagrams 2ª and 3 the field D is manipulated in the same manner as field A in diagrams 1ª and 2. Thus in diagram 3 fields C and D are placed in parallel in series with fields A and B in parallel. Rotor D' is short-circuited while the change is being made, as shown in 2ª. In diagram 3ª the circuit of field A is open and rotor-winding A' is short-circuited. In diagram 4 field A is connected across the line and is thus placed in parallel with the circuit formed by field B and the parallel circuit C and D, which is in series with field B. This gives the third running position and the third speed. In diagrams 4ª and 5 the same change is made in the connections of field-winding D. Thus in diagram 5 there are three parallel circuits across the line, one consisting of winding A, one of winding D, and the third of windings B and C in series. This gives the fifth running position and the fifth speed. In diagram 5ª winding B and rotor-winding B' are both short-circuited, and in diagram 6 windings B and C are both connected across the line in parallel with the other field-windings. This gives the last running position and the highest speed. It is evident that by varying the connections, as shown in the diagrams, a gradual acceleration from rest to full speed may be obtained without the use of any resistance or method of voltage regulation. Furthermore, it will be seen that neither circuit is at any time open during the changes. The secondary circuit is always maintained closed, and the only changes introduced are the short-circuiting of the several rotors one at a time. In the primary circuit nearly all the connections that are changed are opened at a time when they are carrying no current, the changes in 3ª and 4ª being the only exceptions, and in this case the break in the connections is paralleled by a field of one of the other motors. It will be seen that my method of control is especially adapted to the control of a plurality of alternating-current motors from a single point, as in the case of the motors on a train.

Referring now to Fig. 2, an arrangement of switch contacts and circuits is shown adapted to produce the circuit arrangements, as shown in Fig. 1. T represents the trolley connection, which is connected to contact-finger $f'$. E represents the earth connection, which is connected to finger $f^{13}$. The fields of the motors are connected to contact-fingers $f^2$ and $f^{12}$, inclusive, and the secondary members to contact-fingers $f^{14}$ to $f^{17}$, inclusive. On the controller-drum are mounted twenty-eight contact-plates, which are electrically connected in groups, as follows: Group 1 comprises plates 1 to 5; group 2, plates 6 and 7; group 3, plates 8 to 11; group 4, plates 12 and 13; group 5, plates 14 to 18, and five other groups, each comprising a pair of contact-plates. Plates 1 to 18, inclusive, are for the high-tension field-circuit and plates 19 to 28 for the low-tension secondary or rotor circuit. In the position indicated by dotted line $1^x$ the motors are connected as shown in diagram 1 of Fig. 1. The current enters at T, passing to contact-finger $f'$, to plate 1, to plate 2, to contact-finger $f^2$, through field A to contact-finger $f^3$, to plate 6, to plate 7, to contact-finger $f^4$, to field B, to contact-finger $f^6$, to plate 9, to plate 10, to contact-finger $f^7$, to field C, to contact-finger $f^9$, to plate 12, to plate 13, to contact-finger $f^{11}$, to field D, to contact-finger $f^{12}$, to plate 17, to plate 18, to contact-finger $f^{13}$, to earth, thus placing all four fields in series. The secondary or rotor members are permanently connected in a local closed circuit. At the position shown by line $1^{ax}$, corresponding to diagram $1^a$, the only change is the short-circuiting of field A. In this position a current passes from T to contact-finger $f'$, to plate 1, directly to plate 3, to contact-finger $f^5$, and to field B. In moving from position $1^{ax}$ to position $2^x$ the circuit of field A is opened by contact-finger $f^3$ leaving plate 6, and field A is connected by contact-finger $f^3$ and plates 8 and 9 to the junction of the fields B and C. This is running position 2 and corresponds to diagram 2. When position $2^{ax}$ is reached, field D is similarly short-circuited and is connected by means of plates 11 and 10 to the junction of fields B and C. In passing from position $3^x$ to $4^x$ the circuit of field A is opened by contact-finger $f^3$ leaving plate 8 and is connected to earth by contact-finger $f^3$, plate 14, and plate 18. In passing from position $4^x$ to $5^x$ field D is open-circuited by contact-finger $f^{11}$ leaving plate 11 and then is connected to the line by means of plate 5 and plate 1. In passing from position $5^x$ to position $6^x$ field B is short-circuited by means of contact-finger $f^8$ and plate 4, which connect field C directly to T through plate 1. Field B is then open-circuited by contact-finger $f^6$ leaving plate 9 and is connected to earth by plates 15 and 18. The pairs of secondary contacts serve to short-circuit the different rotor members as the changes are made. It will not be necessary to trace out these short-circuits, as they will be evident from the drawings, together with the diagrams of Fig. 1.

Many other arrangements of switch-contacts and circuit connections may be used to produce the same circuit changes. Accordingly I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. The method of controlling a plurality of alternating-current motors having primary members and secondary induced members, which consists in connecting said primary members to a source of alternating current, connecting said secondary members in a local closed circuit, and varying the series-parallel relations of said primary members.

2. The method of controlling a plurality of alternating-current motors having primary and secondary members, which consists in connecting said primary members in varying series-parallel relations to a source of alternating current, and maintaining said secondary members in a local closed circuit.

3. The method of controlling a plurality of alternating-current motors having primary and secondary members, which consists in connecting said primary members in series to a source of current, connecting said secondary members in a local closed circuit, and then gradually shifting said primary members to parallel.

4. The method of controlling a plurality of alternating-current motors having primary and secondary members, which consists in connecting said primary members to a source of alternating current, connecting said secondary members in series in a local closed circuit, and varying the series-parallel connections of said primary members without disturbing the series connections of said secondary members.

5. The method of controlling four alternating-current motors having primary and secondary members, which consists in maintaining said secondary members in a local closed circuit, connecting said primary members in series to a source of current, then changing the connections of said primary members to parallel series, and then changing said connections to parallel.

6. The method of controlling a plurality of alternating-current motors having their primary members connected to a source of current and their secondary members in a local closed circuit, which consists in varying the relative connections of said primary members, and short-circuiting a secondary member whenever its primary is short-circuited in changing connections.

7. The method of varying the series-parallel connections of the primary members of a plurality of motors having their secondary members connected together in a local closed circuit, which consists in short-circuiting the secondary member of a motor whenever its primary member is short-circuited.

8. The method of controlling a plurality of alternating-current motors having primary and secondary members, which consists in connecting said primary members in series to a source of current, connecting said secondary members together in a local closed circuit, changing the connections of said primary members to series parallel and then to parallel, and short-circuiting each secondary member whenever its primary member is short-circuited.

9. The method of controlling a plurality of alternating-current motors, which consists in connecting the primary members of said motors in varying series-parallel relations to a source of current, maintaining the secondary members of said motors in a local closed circuit, and short-circuiting each secondary member whenever its primary member is short-circuited.

In witness whereof I have hereunto set my hand this 28th day of December, 1903.

MAURICE MILCH.

Witnesses:
BENJAMIN B. HULL,
BURTON C. ANTHONY.